J. T. FRITSCHE.
ADVERTISING DEVICE.
APPLICATION FILED MAR. 16, 1915.

1,274,530.

Patented Aug. 6, 1918.
2 SHEETS—SHEET 1.

Witnesses.
E B Gilchrist
A J Hudson

Inventor
John T. Fritsche
by Thurston & King
attys

J. T. FRITSCHE.
ADVERTISING DEVICE.
APPLICATION FILED MAR. 16, 1915.

1,274,530.

Patented Aug. 6, 1918.
2 SHEETS—SHEET 2.

Witnesses
E. B. Gilchrist
A. J. Hudson

Inventor
John T. Fritsche
by Thurston & King
attys

UNITED STATES PATENT OFFICE.

JOHN T. FRITSCHE, OF CLEVELAND, OHIO.

ADVERTISING DEVICE.

1,274,530.	Specification of Letters Patent.	Patented Aug. 6, 1918.

Application filed March 16, 1915. Serial No. 14,741.

*To all whom it may concern:*

Be it known that I, JOHN T. FRITSCHE, a citizen of the United States, residing at Cleveland, in the county of Cuyahoga and State of Ohio, have invented a certain new and useful Improvement in Advertising Devices, of which the following is a full, clear, and exact description.

This invention relates to a device for the projecting of pictures, advertising matter, etc., the object being to provide a device which may be utilized as an advertising display device, in which succeeding pictures and advertising plates will be projected upon a screen, automatically and in proper sequence.

Generally speaking, the invention comprises the elements and combinations thereof set forth in the accompanying claim.

Figure 1:
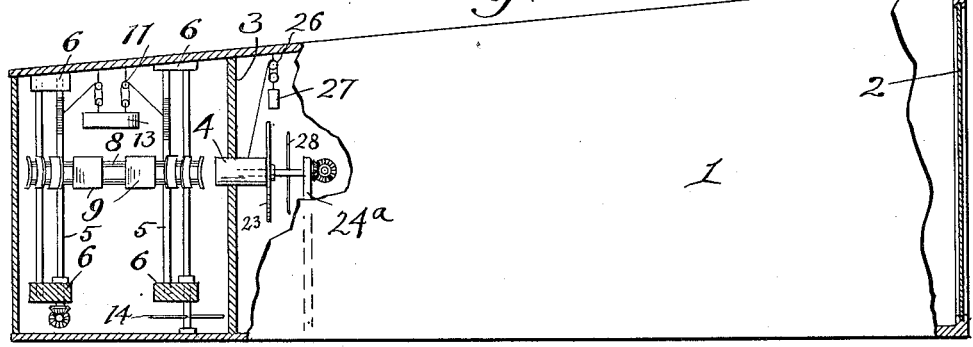
Figure 2:
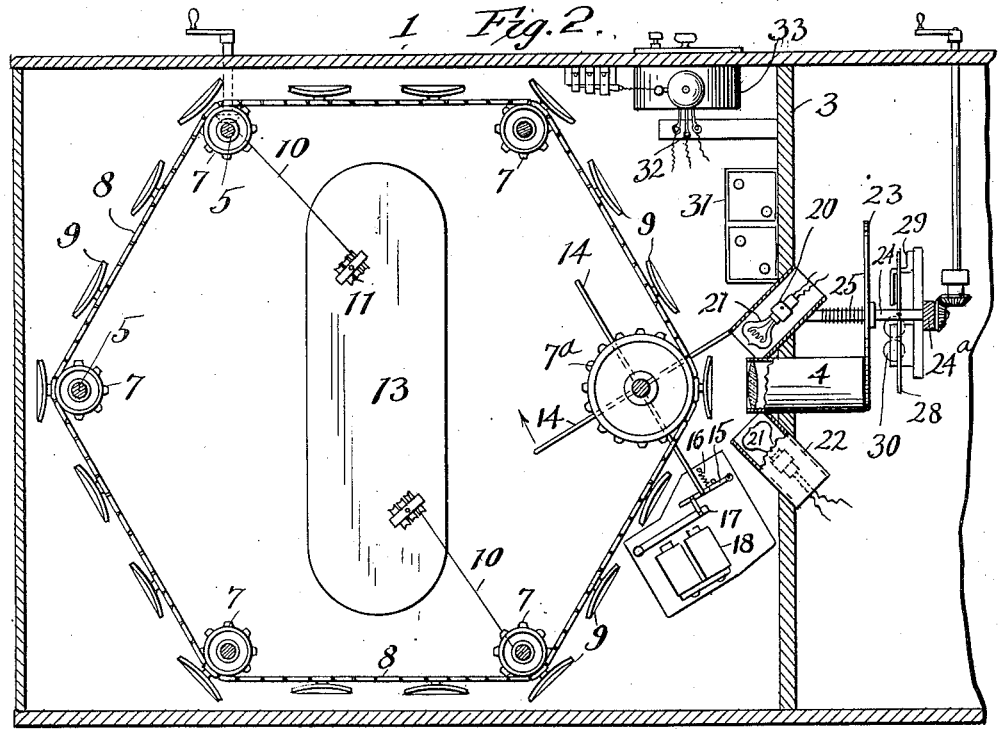
Figure 4:
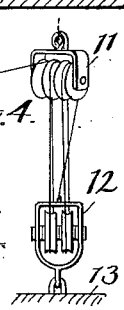
Figure 3:
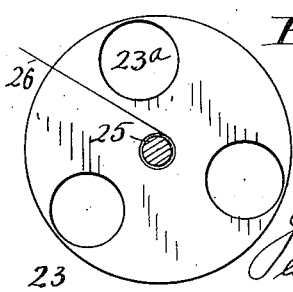
Figure 8:
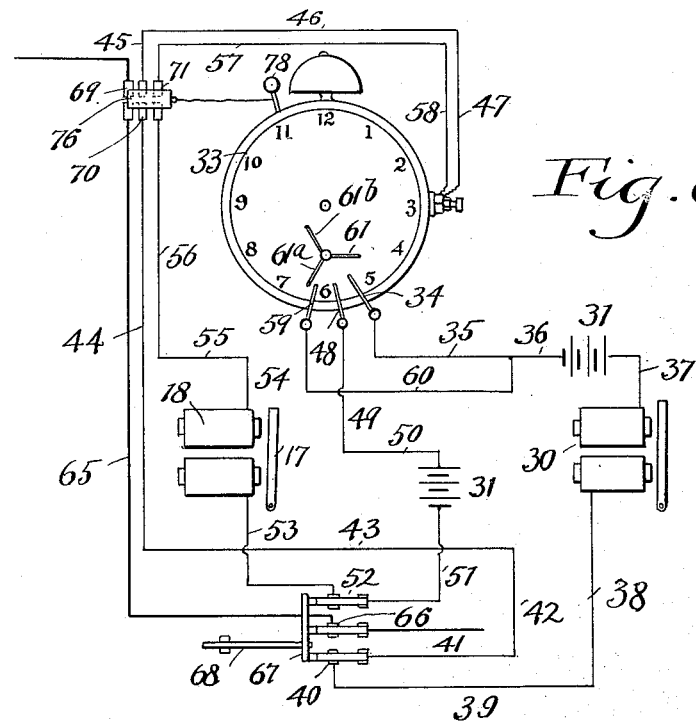
Figure 5:
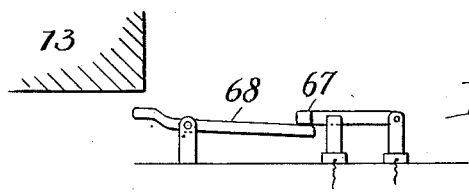
Figure 6:
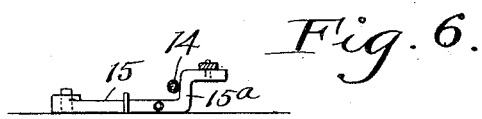
Figure 7:
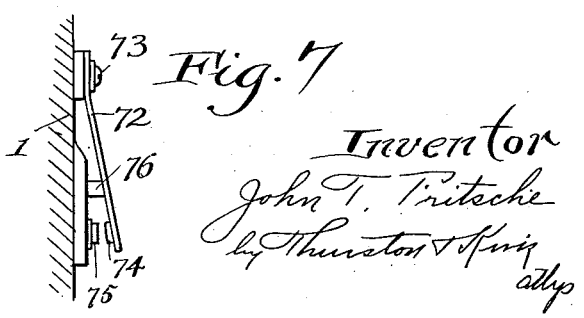

Reference should be had to the accompanying drawings forming a part of this specification, in which Figure 1 is a central side elevation with certain portions shown in section, of the device, Fig. 2 is a top plan view with the container shown in section; Fig. 3 is an elevation of the shutter employed; Fig. 4 shows the manner of supporting the operating weight; Fig. 5 shows switch mechanism for automatically stopping the operation of the machine; Fig. 6 is a detail of a releasing device; and Fig. 7 is a detail of a switch for opening the various circuits; Fig. 8 is a diagrammatic view showing various circuits.

A casing is shown at 1, which is preferably rectangular in shape. This casing is at the forward end open and provided with suitable means to receive and hold a translucent screen 2 upon which the pictures and advertising matter may be projected. Near the rear end of the casing is a partition 3 which divides the casing into two parts. This partition is substantially light proof, so that the lighting mechanism and the operating mechanism for the pictures may be contained and housed in the rear portion of the casing, while the forward part of the casing is unoccupied except by the shutter and mechanism for operating the same.

The partition 3 has projecting through it a tubular casing 4 which houses suitable lenses for projecting a picture onto the screen 2. The projecting lenses are of a suitable and desired type, and no description of them will be given. The cylindrical casing 4 is preferably supported in the partition 3.

There are a plurality of shafts 5 which are supported at their upper and lower ends by transversely extending members 6. Upon each of these shafts there is mounted a sprocket wheel or gear 7. These sprocket wheels receive and support a linked chain 8, the chain extending around the outer portions of the gears 7. The chain 8 has mounted at suitable intervals thereon supports 9 which are adapted to receive and support a plate or card having thereon the pictures or advertising matter which is to be projected.

Opposite to the lens casing 4 there is mounted a gear $7^a$ which is of slightly greater diameter than the gear 7. This gear is of such diameter that the chain 8 in passing over the gear will present each succeeding picture support 9 to be in proper position to properly present the picture to the lens in the casing 4, that is to say, each support 9 must be squarely presented to the lenses within the casing 4, so as not to cause a distortion of the projected picture.

Around certain of the shafts 5 there are normally wound cables 10. These cables coöperate with pulleys, such as shown in Fig. 4, which as shown assume the form of a sheave block that coöperates with a corresponding sheave block 12.

The sheave blocks 12 support a weight 13 which is of proper gravity to cause the turning of the shaft 5 and the devices operated thereby, as it descends.

The shafts 5 are held against rotation by a mechanism which releases the shafts at intervals a sufficient distance to move the chain 8 the proper distance to bring the supports 9 in relatively proper position with respect to the lens casing 4. Upon the lower part of the shaft 5 which is adjacent to the lens casing 4 there are mounted four projecting arms 14. Each arm moves in a path which is obstructed by a latch 15. This latch is retained by a spring 16 in proper position to engage with one of the arms 14.

The latch is operated by the armature 17 of an electromagnet 18. The latch 15 is shown in detail in Fig. 6, and is there shown as provided with a shoulder $15^a$ against which the projecting arms 14 are adapted to engage. It will be apparent that as the electromagnet 18 is operated the latch will be successively withdrawn and permit the shaft 5 to turn under the action of the weight 13.

Adjacent the inner end of the lens casing 4 sources of light, as indicated at 20, are supported. In the particular instance shown the sources of light comprise a lamp 21 which is an electrical bulb of proper intensity and size. Each lamp is supported within a tubular barrel 22 and if desired proper reflecting means may be used to throw all the light out of the inner end of the barrels 22. These barrels 22 are so mounted that the sources of illumination which they contain will project their light upon the particular spot 19 which may be in front of the lens casing 4. The light thus projected will be reflected from the surface of the support 9 through the lenses in the casing 4 and onto the screen 2.

It will be noted that the supports 9 are curved or cup-shaped, and the amount of this cupping is dependent upon the curvature of the lenses within the casing 4, the purpose of the cup being to counteract any tendency for distortion of the picture which is being projected. There is a shutter 23 mounted upon a shaft 24, the shaft being supported at its inner end in the partition 3 and at its outer end in an upright support 24. The shutter is provided with three openings indicated at 23ᵃ, these three openings coming in front of the lens casing 4 in succession as the shutter is revolved.

The shutter is revolved by a weight and cable arrangement. A cable 25 is wound about the shaft 24. The free end of this cable extends over a pulley arrangement, generally indicated at 26 in Fig. 1. This pulley arrangement is similar in all respects to that shown in Fig. 4; a weight 27 is supported by the pulley tackle 26, so that under the influence of the weight descending by gravity the shaft 24 will be turned and thus rotate the shutter 23.

The movement of the shaft 24 is controlled by a mechanism similar to that which controls the movement of the shaft 7ᵃ, that is to say, there are a plurality of arms 28 which extend outwardly from the shaft 24, the arms lying substantially in the same plane. There are six such arms.

These arms are adapted to impinge against the lever 29, which lever is controlled by an electromagnet 30 in a manner similar to that described with respect to the lever 15 and the electromagnet 18.

The electromagnets 18 and 30 are energized from batteries indicated at 31, and the opening and closing of the circuit which energizes the magnets is controlled by switches generally represented at 32 controlled by a timing mechanism represented at 33.

In Fig. 8 there is shown a diagram of the electrical connections between the batteries 31 and the electromagnets 18 and 30.

It will be seen that the electromagnet 30 lies in a circuit which comprises the contact 34, conductor 35, conductor 36, conductor 37, electromagnet 30, conductor 38, conductor 39, switch 40, conductor 41, conductor 42, conductor 43, conductor 44, conductor 45, conductor 46, conductor 47, to the casing of the clock 33. The circuit which controls the electromagnet 18 is as follows: contact member 48, conductor 49, conductor 50, battery 31, conductor 51, switch 52, conductor 53, electromagnet 18, conductors 54, 55, 56, 57 and 58 to the casing of the clock 33.

There is a second circuit which includes the electromagent 30; this circuit includes contact member 59, conductor 60, battery 31, conductor 37, electromagnet 30, conductors 38 and 39, switch 40, conductors 41, 42, 43, 44, 45, 46, 47 and the case of clock 33.

The shaft of the clock which usually turns the second hand, is provided with three arms 61, 61ᵃ and 61ᵇ, which are equally spaced so that the circuit through each of the contacts 34, 48 and 59 are successively closed and opened in succession three times during each minute or each rotation of the shaft.

If we follow the movement of arm 61, we see that the contact 34 is first engaged which results in energizing magnet 30 and releases the mechanism holding shutter 23, so that the shutter can rotate. The contact at 34 is but momentary, so that the mechanism which holds the shutter 23 will immediately after releasing, be in position to arrest the motion of the shutter as the next arm 28 comes around. The turning of the shutter presents an opaque portion of the shutter opposite the lens casing 4.

Immediately after leaving contact 34, the arm 61 will pass to contact 48, which would complete the circuit including the electromagnet 18 and release the arm 14 held by the latch lever 15, thus permitting the gear 7ᵃ and gear 7 to turn under the influence of the weight 13 and so bring a succeeding holder 9 in line with lens casing 4. The contact of the arm 61 with contact 48 is but momentary, so that immediately after release the latch arm 15 is in position to arrest the arm 14 following that one previously released.

The contact arm 61 next moves to engage contact 59, which again completes the circuit through the electromagnet 30, and in the manner before described, the shutter is permitted to turn so as to bring one of the openings 23ᵃ of the shutter in line with the lens casing 4.

It will thus be seen that the passage of arm 61 over contacts 34, 48 and 59 will successively cause the shutter to move, to shut off the light, then move a succeeding holder and in front of the lens casing and then move the shutter to permit light to pass. These operations follow in quick succession and occupy but a short space of time.

The arms 61, 61ª and 61ᵇ engage the contacts in succession, and so that a change of picture occurs three times in a minute. Obviously, the number of arms may be changed to cause a greater or less number of changes in a given interval of time.

The source of light for illumination of the pictures is preferably electric light, and in Fig. 8 I have indicated at 65 one side of the lighting circuit. This includes a switch 66.

The switches 40, 66 and 52 are so constructed as to be simultaneously operable by the cross piece 67. Beneath the cross piece there extends one end of a lever 68. This lever is pivoted between its ends. The end opposite to that above mentioned is in the path of movement of the weight, so that when the weight reaches its lowermost position, it will engage lever 68 and raise the cross-piece 67, thus opening the switches in the light circuit and the switches in each electromagnet circuit.

I have also provided a mechanism whereby the apparatus may be put in operation at a predetermined time. This mechanism comprises a switch 69 in the light circuit, a switch 70 in the circuit of magnet 30 and a switch 71 in the circuit of magnet 18. The detail construction of each switch is the same, and is illustrated in Fig. 7. One side of each circuit is connected with a flexible conducting strip which is secured at 73. At its unsecured end the strip carries a contact piece 74, which is oppositely disposed to a contact piece 75.

The flexible strips of switches 69, 70 and 71 are engaged by a wedge 76, which will hold the contacts 74 and 75 apart. The wedge 76 is by a cord or flexible member 77 secured to the hammer 78 of the clock. The clock alarm mechanism may be set to release at any given hour, and as the hammer first moves it pulls the wedge 76, and so permits the switches 69, 70 and 71 to be closed, and the various instrumentalities of the device will function.

Having thus described my invention, what I claim is:—

In a device of the character described, the combination of a casing, a projecting lens in a wall thereof, an endless carrier mounted to revolve within the casing behind said lens, a series of holders secured to said carrier, sprocket wheels on which said carrier travels, means for imparting motion to the sprocket wheels, arms connected to one of the sprocket wheels, electrically controlled means for engaging and releasing said arms for periodically stopping the carrier so that the holders may be brought successively in alinement with the lens, and a source of light adapted to be reflected through said lens by said holders.

In testimony whereof, I hereunto affix my signature in the presence of two witnesses.

JOHN T. FRITSCHE.

Witnesses:
A. J. HUDSON,
C. V. SCHURGER.